(12) United States Patent
Thompson

(10) Patent No.: US 9,149,667 B2
(45) Date of Patent: Oct. 6, 2015

(54) SAFETY DEVICE

(71) Applicant: Thompson Tree Tool, LLC, Ithaca, NY (US)

(72) Inventor: Morgan Thompson, Ithaca, NY (US)

(*) Notice: Subject to any disclaimer, the term of this patent is extended or adjusted under 35 U.S.C. 154(b) by 198 days.

(21) Appl. No.: 13/803,503

(22) Filed: Mar. 14, 2013

(65) Prior Publication Data

US 2014/0262622 A1    Sep. 18, 2014

(51) Int. Cl.
| | | |
|---|---|---|
| *F16G 11/00* | (2006.01) | |
| *A62B 1/14* | (2006.01) | |
| *F16G 11/10* | (2006.01) | |
| *A63B 29/02* | (2006.01) | |
| *A63B 27/00* | (2006.01) | |

(52) U.S. Cl.
  CPC . *A62B 1/14* (2013.01); *A63B 27/00* (2013.01); *A63B 29/02* (2013.01); *F16G 11/10* (2013.01)

(58) Field of Classification Search
  CPC ........ B63B 21/08; A63B 27/00; A63B 29/02; F16G 11/10; A62B 1/14; A62B 1/04
  USPC ........ 182/5–7, 189–193, 241; 188/65.2, 65.4, 188/65.5
  See application file for complete search history.

(56) References Cited

U.S. PATENT DOCUMENTS

| | | | |
|---|---|---|---|
| 2,773,566 A | 12/1956 | Staggers | |
| 4,883,146 A * | 11/1989 | Varner et al. | 182/5 |
| 5,038,888 A | 8/1991 | Varner et al. | |
| 5,660,133 A | 8/1997 | Munich | |
| 6,085,866 A | 7/2000 | Kowalewski | |
| 6,715,809 B2 | 4/2004 | Thompson | |
| 8,235,172 B2 | 8/2012 | Thompson | |
| 2005/0262669 A1* | 12/2005 | Thompson | 24/134 R |
| 2006/0081418 A1* | 4/2006 | Thompson | 182/193 |
| 2007/0007076 A1* | 1/2007 | Chen et al. | 182/193 |
| 2011/0315480 A1* | 12/2011 | Maurice et al. | 182/193 |

* cited by examiner

*Primary Examiner* — Daniel Cahn
(74) *Attorney, Agent, or Firm* — Daniel P. Malley; Bond Schoeneck & King, PLLC

(57) ABSTRACT

A device for ascending or descending using the single rope technique. The device includes a clamping mechanism that has a plurality of clamping segments interconnected by a flexible spine arrangement. A release mechanism is coupled to the clamping mechanism. A reduction mechanism is coupled to the release mechanism. The reduction mechanism includes a body portion having a rope slot configured to accommodate the single rope and a housing portion disposed over the body portion. The housing portion includes a cammed groove configured to accommodate the single rope. The cammed groove is rotatably aligned with the rope slot. The reduction mechanism is movable with at least two degrees of freedom between the clamping position and the released position. The reduction mechanism is configured to frictionally engage the single rope in the released position.

21 Claims, 9 Drawing Sheets

SAFETY DEVICE

BACKGROUND OF THE INVENTION

1. Field of the Invention

The present invention relates generally to a safety device, and particularly to a device for safely raising and lowering a person using the single-rope technique.

2. Technical Background

There are many types of work that require a climbing device to safely perform a given task. In tree care work, for example, pruning, branch cutting and similar tasks must be performed off the ground and in the tree itself. There are construction jobs that also require the user to work in elevated positions. Some users enjoy mountain climbing or rock climbing as a recreational pursuit. Whatever the activity, it is paramount that the persons engaging in activities such as these be able to ascend, work and descend, safely and effectively, without worry or concern.

In reference to FIG. 1, a diagrammatic depiction of the "two-rope technique" is shown. Here, a rope R is disposed over a support structure Sp. One end of the rope is coupled to an attachment point 2-2 of the apparatus 2, is secured by clamp 2-1, and extends toward the ground. The user is attached to the apparatus at the attachment point 2-2. To ascend, the user pulls the rope R downwardly (See arrow A) at point "P" to pull the apparatus 2 upwardly (See arrow B) toward the support structure. At rest, the clamping structure 2-1 secures the user at some position off the ground. When the user wishes to descend, he depresses the release mechanism 2-3; the attachment mechanism works in conjunction with the clamp 2-1 to apply enough friction and control such that the user slides down the rope in safe manner. One drawback to the two-rope technique relates to the 2:1 mechanical advantage provided by the two-rope technique; while it is relatively easy to pull oneself up the rope, one only travels half as far. Some users do not like this technique and prefer the single rope technique instead.

Referring to FIGS. 2A-2B, a diagrammatic depiction of the "single rope technique" is shown. In this case, one end of the rope R is anchored or secured to the ground. The rope R extends over the support structure Sp, and is secured by the clamp 1-1. The attachment point 1-2 connects the user, or the user's harness, to the climbing apparatus 1, but is not connected to the rope. The single rope technique therefore provides no mechanical advantage. There is a 1:1 relationship between the pulling distance and traveling distance because they are one and the same. One of the drawbacks associated with the single rope technique occurs when the user actuates the release mechanism. Briefly stated, once the clamp 1-1 is released, the user has a tendency to rapidly descend down the rope with little control.

Referring to FIG. 2B, the approach commonly employed to overcome the above stated drawback is shown. In order to obviate the above stated drawback, the user wraps the rope around the clamp 1-1 to effect a technique that is appropriately referred to as a "rope wrap" 1-4. In particular, when the user actuates the release 1-3, she is holding the lower portion of the rope R tightly against the clamp portion 1-1 such that the rope wrap 1-4 increases the coefficient of friction as the rope R moves in the direction A over the clamp 1-1. The applied friction slows the user's descent and allows the user to lower herself with greater control.

One drawback associated with the rope wrap technique occurs at the moment the user actuates the release 1-3. There is a momentary drop, or jerk, that occurs when the release takes up some of the slack in the rope or line. This sudden movement is very unsettling to the user. Many users report a sense of panic and feel unsafe when this occurs. Another drawback to this approach occurs when the user descends to a new position to continue work. Once the user is in position, the release mechanism is disengaged and the clamp secures the rope. Next, the user must undo the rope wrap 1-4. However, this step in the process typically causes another sudden drop. Once again, the user momentarily thinks that she is about to fall. Again, this sudden movement is unsettling and annoying.

What is needed, therefore, is an apparatus adapted to the single rope technique that overcomes the drawbacks described above. In particular an apparatus is needed that avoids the sudden drops associated with the rope wrap and the conventional single rope technique apparatus.

SUMMARY OF THE INVENTION

The present invention provides an apparatus adapted to the single rope technique that overcomes the drawbacks described above. The present invention is directed to an apparatus that provides control at all times such that the sudden jerks or drops associated with the rope wrap and the conventional single rope technique apparatus are substantially eliminated.

One aspect of the present invention is directed to a safety device for use in a single rope technique arrangement. The device includes a clamping mechanism including a plurality of clamping segments interconnected by a flexible spine arrangement. Each of the plurality of clamping segments includes a rope channel having a first aperture and a second aperture sized to substantially accommodate a diameter of the single rope. The first aperture is substantially offset from the second aperture. A release mechanism is coupled to the clamping mechanism. The release mechanism is configured to apply a first force to the flexible spine that substantially misaligns the rope channels of adjacent clamping segments in a clamping position and apply a second force that substantially aligns the rope channels of adjacent clamping segments in a released position. A reduction mechanism is coupled to the release mechanism. The reduction mechanism includes a body portion having a rope slot configured to accommodate the single rope and a housing portion disposed over the body portion. The housing portion includes a cammed groove configured to accommodate the single rope. The cammed groove is rotatably aligned with the rope slot. The reduction mechanism is movable with at least two degrees of freedom between the clamping position and the released position. The reduction mechanism is configured to frictionally engage the single rope in the released position.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 7:
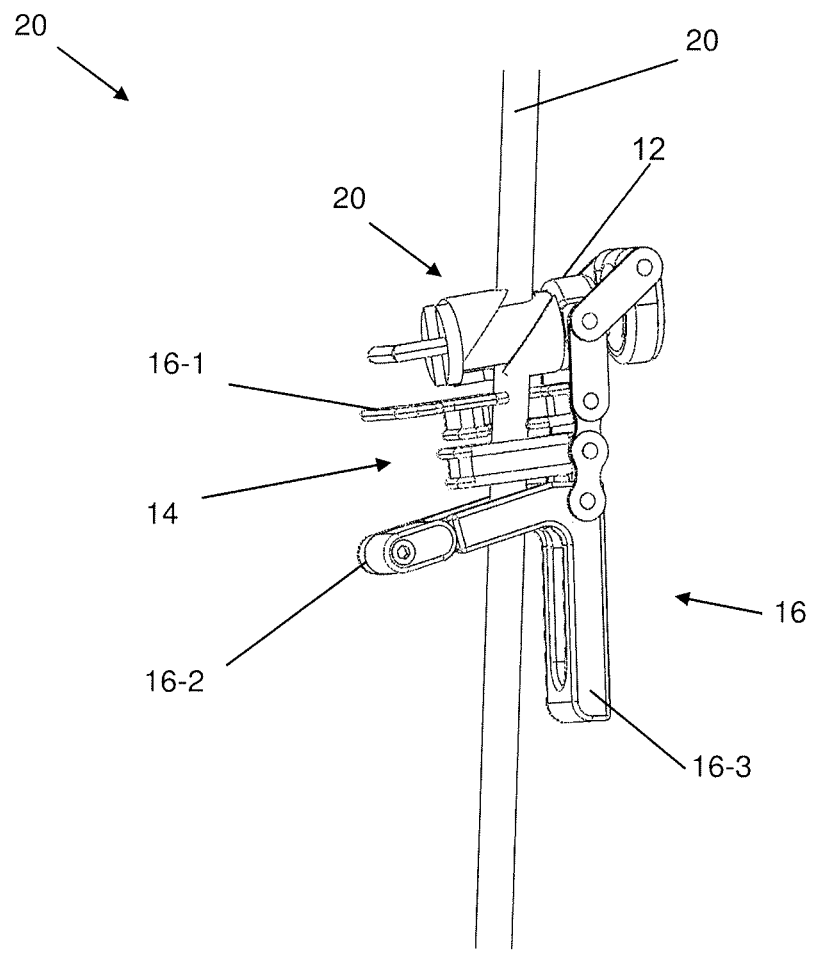
FIG. 7 is a detail perspective view of the safety device in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the climbing mechanism of the present invention are shown in FIGS. 3, 5 and 7, and is designated generally throughout by reference numeral 10.

Figure 1:
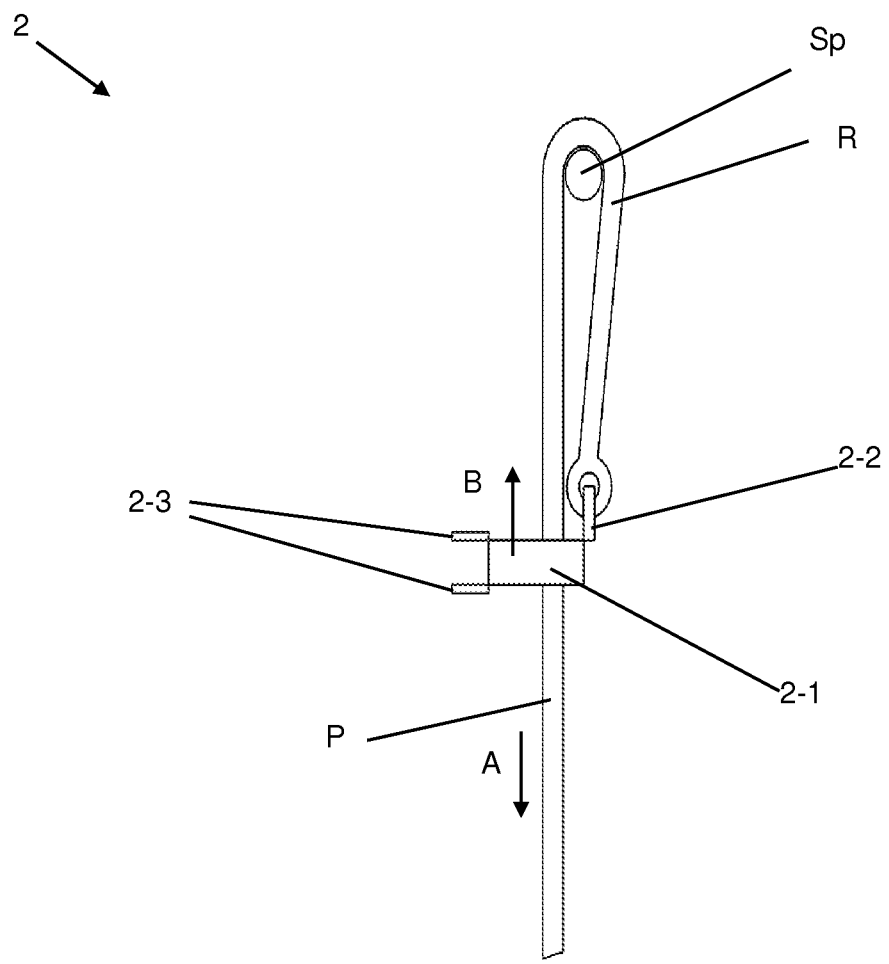
FIG. 1 is a diagrammatic depiction of the two rope technique.
Figure 2A:
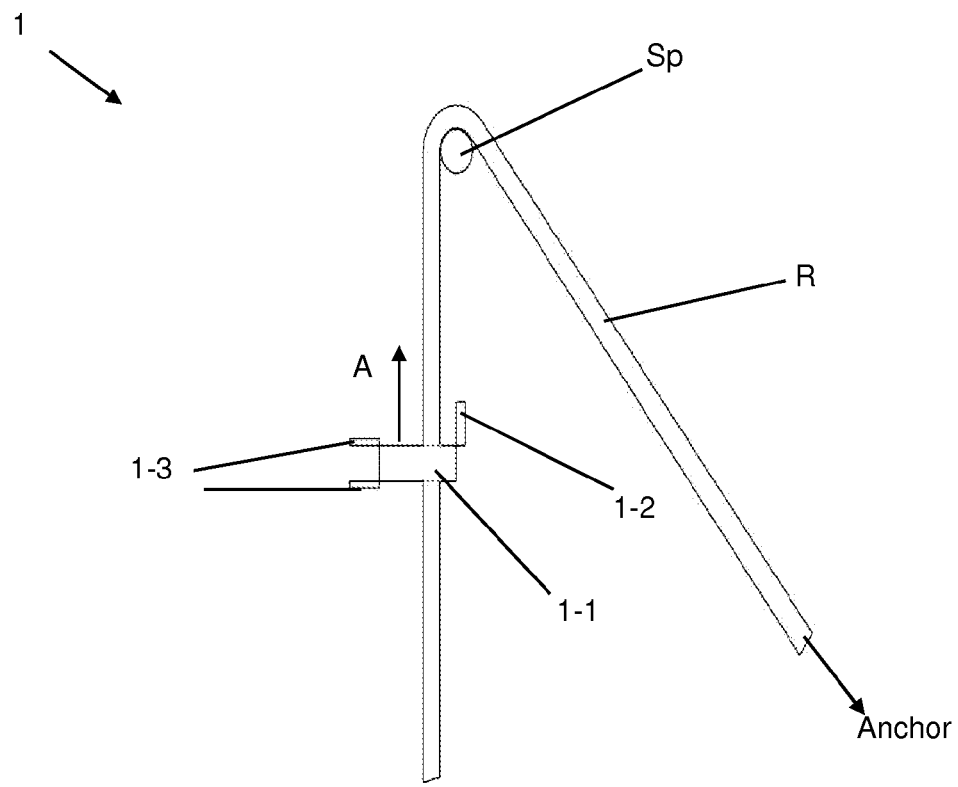
FIGS. 2A-2B are a diagrammatic depictions of the single rope technique.
Figure 2B:
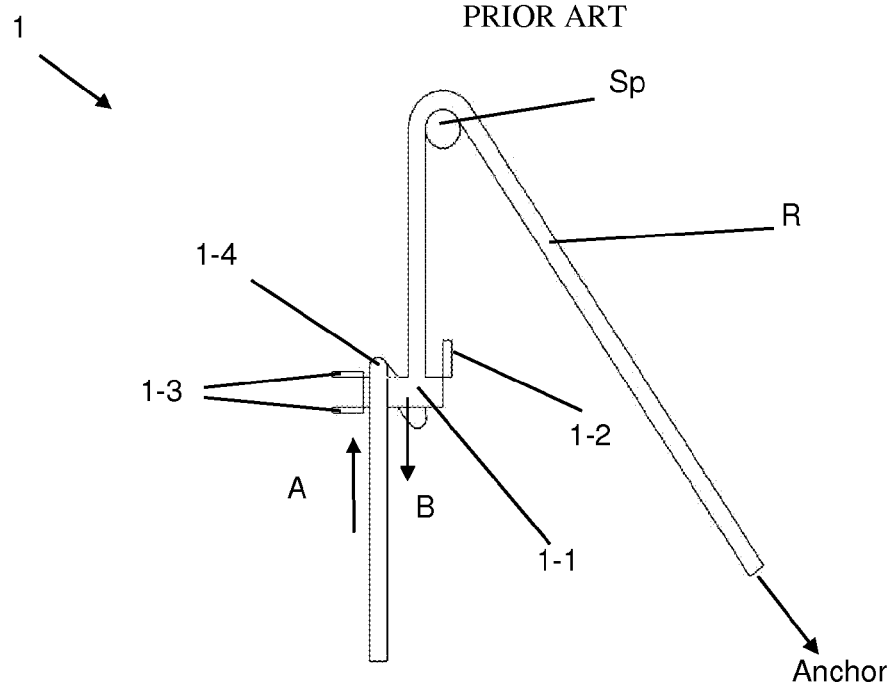
Figure 3:
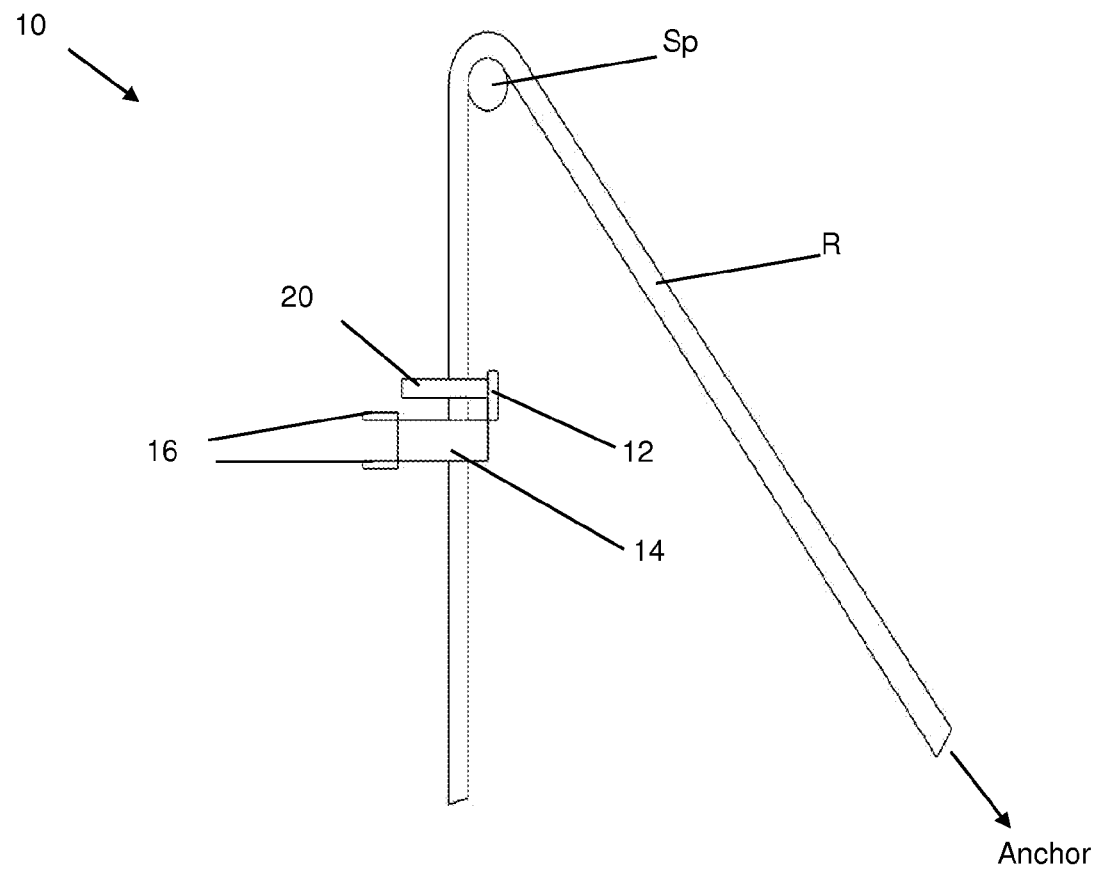
FIG. 3 is a diagrammatic depiction of the single rope technique in accordance with the present invention.

As embodied herein, and depicted in FIG. 3, a diagrammatic depiction of the single rope technique in accordance with the present invention is disclosed. Specifically, a safety device 10 of the present invention includes a connector 12 that is coupled to a clamping apparatus 14 and a reduction mechanism 20. The clamping mechanism is equipped with a release mechanism 16. In practice, a single rope R is inserted into, and passes through, both the reduction mechanism 20 and the clamp apparatus 14. Essentially, when the user releases the clamp apparatus 14, the reduction mechanism is automatically engaged to substantially prevent the user from momentarily dropping.

Figure 4A:
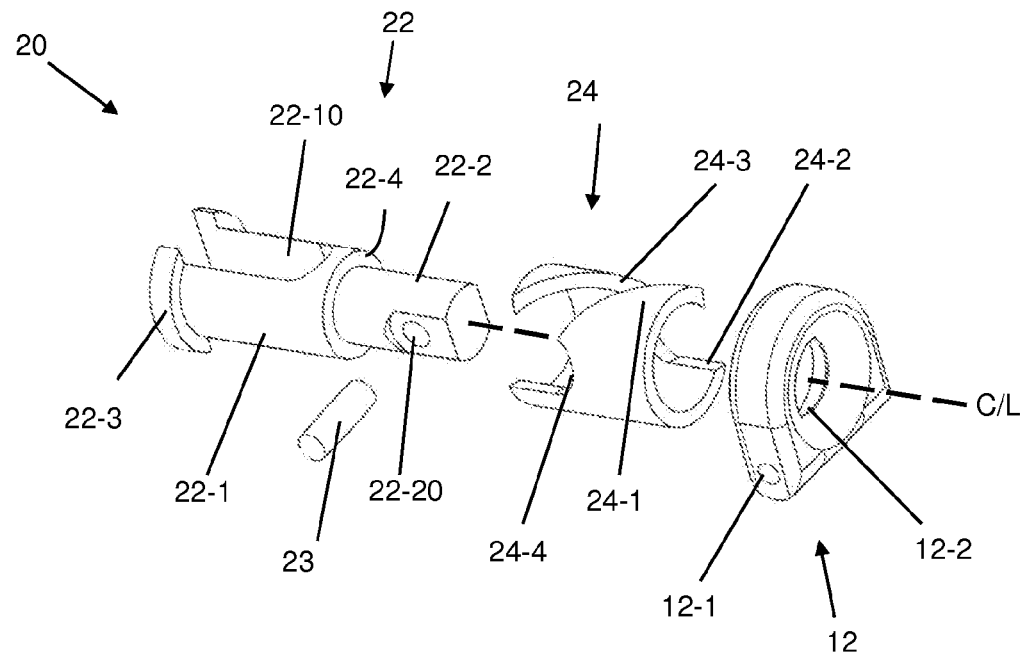
FIGS. 4A-4B are exploded views of embodiments of the reduction mechanism depicted in FIG. 3.
Figure 4B:
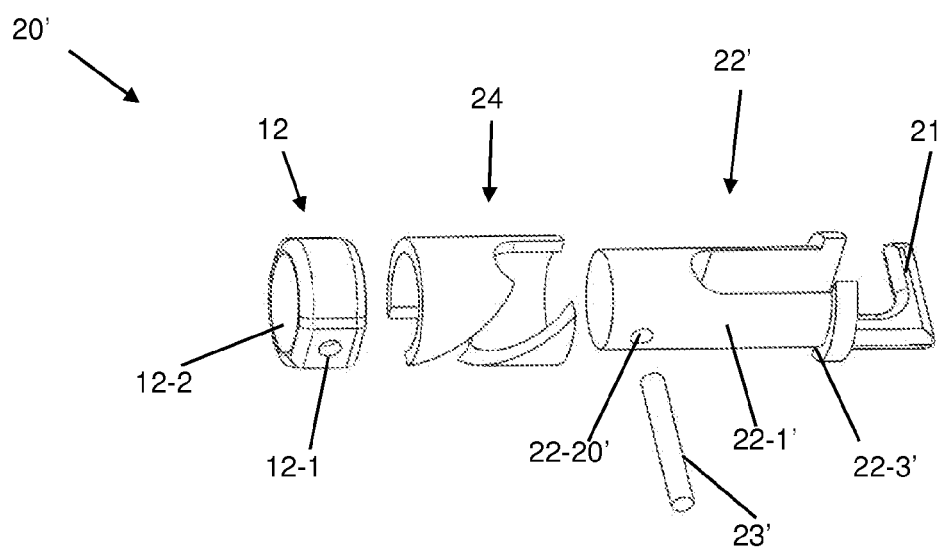

Referring to FIGS. 4A-4B, exploded views of embodiments of the reduction mechanism 20 diagrammatically depicted in FIG. 3 are disclosed. The reduction mechanism shown in FIG. 4A includes a yoke 22 that includes a U-shaped body portion 22-1 having an elongated slot 22-10 formed therein. A shoulder 22-3 is formed at one end of the yoke body 22-1 and a connective boss 22-2 extends from the other end of the body portion 22-1. The connective boss 22-2 has a narrower diameter than the yoke body 22-1 and thus a second shoulder 22-4 is formed at the yoke/boss interface. The connective boss 22-2 includes a pin aperture 22-20 that is configured to accommodate a retaining pin 23.

The reduction mechanism 20 also includes a cammed bushing 24 that is configured to slide over the yoke body portion 22-1. The cammed bushing 24 includes a rope ingress pocket 24-2, a curvilinear diagonal slot 24-3 that forms the cammed surface 24-1, and a rope egress pocket 24-4. The function of each of these features is described below in greater detail.

The reduction mechanism 20 further includes a collar portion 12 that includes a central opening 12-2 that accommodates the connective boss 22-2. Once the boss 22-2 is inserted into collar opening 12-2, the collar 12 is seated on the shoulder 22-4 such that the pin aperture 22-20 is exposed. Once the collar 12 is in place, the retaining pin 23 is inserted into the exposed pin aperture 22-20 to complete the assembly 20. Note that the collar 12 includes an opening 12-1 formed in the side thereof. The opening 12-1 is configured to accommodate a retaining pin (not shown in this view) that interconnects the reduction mechanism 20 and the clamp apparatus 14 (also not shown in this view).

Referring to FIG. 4B, another embodiment of the reduction mechanism 20' in accordance with the present invention is disclosed. In this embodiment, the yoke 22' does not include a boss extending from the yoke body; rather, the yoke body 22-1' has a single diameter from shoulder 22-3' onward. In this case both the cammed bushing 24 and the collar 12 fit over the yoke body 22-1'. The pin 23' connects the collar 12 to the body 22 such that the cammed bushing 24 is disposed between the shoulder 22-3 and the collar 12 with enough clearance to allow the cammed bushing 24 to rotate freely. Moreover, the clearance allows both the bushing 24 and the collar 26' to slide somewhat along the longitudinal axis of the yoke body 22-1' between the shoulder 22-3 and the pin 23'. Thus, the cammed bushing 24 operates with two degrees of freedom in carrying out its functions. The reader will note that an L-shaped release member 21 is shown in this view. The previous embodiment (See FIG. 4A) can employ the same or a similar release member 21.

Figure 5A:
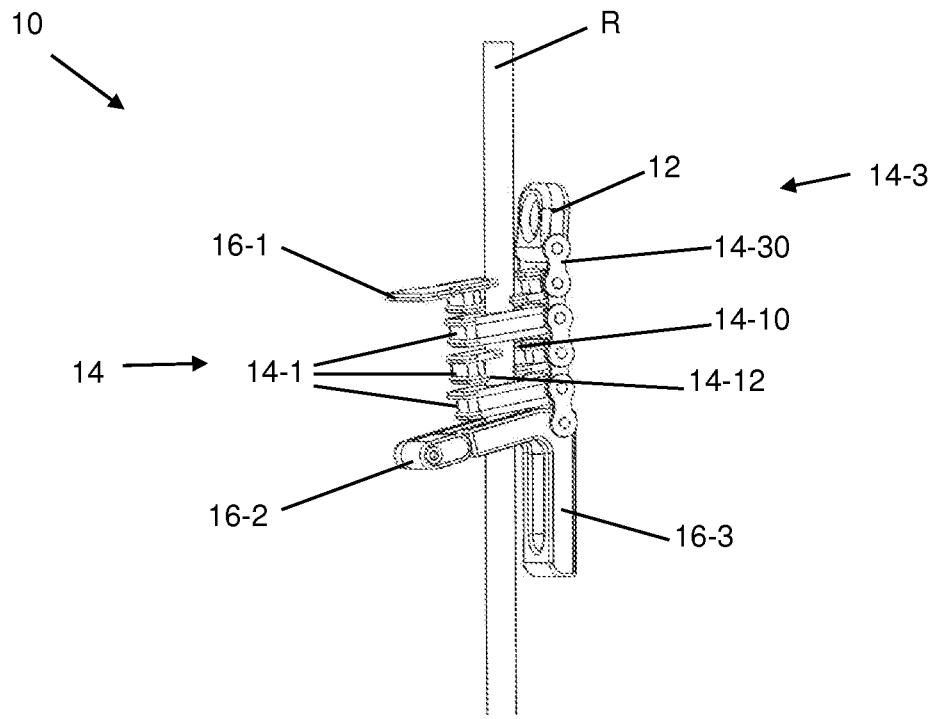
FIG. 5A is a perspective view of the safety device depicted in FIG. 3 with the reduction mechanism removed.

Referring to FIG. 5A, a perspective view of the safety device 10 depicted in FIG. 3 (with the reduction mechanism 20 removed) is disclosed. The device 10 is depicted in situ with the single rope R extending through the clamp 14. The clamp 14 includes a spine 14-3 that is comprised of interconnected link elements 14-30. The top link accommodates the retaining pin that couples the collar 12 to the remainder of the spine 14-3. Moreover, each link 14-30 provides a connection point for each clamp segment 14-1. In this view, the clamp 14 includes four clamping segments 14-1. The clamping segments 14-1 are flanked on the top by a release tab 16-1 and on the bottom by a second release tab 16-2, that together comprise the release mechanism. The release mechanism 16 is depicted as an L-shaped member that includes a handle portion 16-3. Note that the vertical slot in the handle 16-3 also functions as the attachment point for the users harness.

Figure 5B:
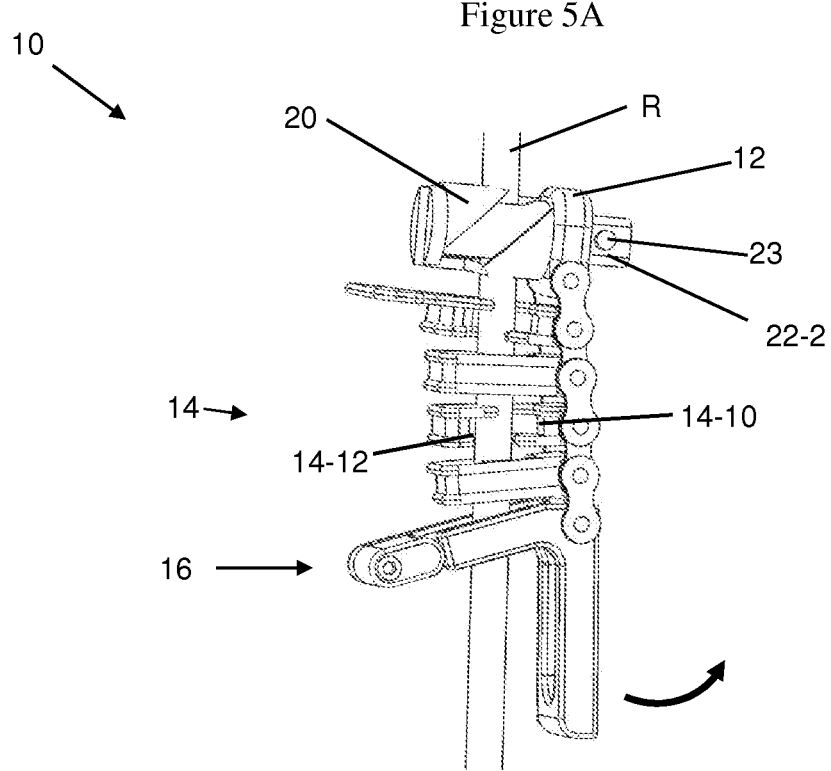
FIG. 5B is a perspective view of the safety device depicted in FIG. 3 with the reduction mechanism attached.

Turning now to FIG. 5B, a perspective view of the safety device 10 is disclosed, this time with the reduction mechanism 20 attached thereto. Here, the boss 22-2 is shown extending through the collar 12 with the retaining pin 23 in place such that the reduction gear 20 is coupled to the clamp 14. In the detail view of FIG. 5B, each clamp segment 14-1 is shown to include a top aperture 14-10 and a lower aperture 14-12. The apertures (14-10, 14-12) are deliberately misaligned and off-center one from the other. When the device 10 is shown in the operating position shown in FIGS. 5A-5B, the misaligned apertures (14-10, 14-12) clamp the rope R.

Figure 6A:
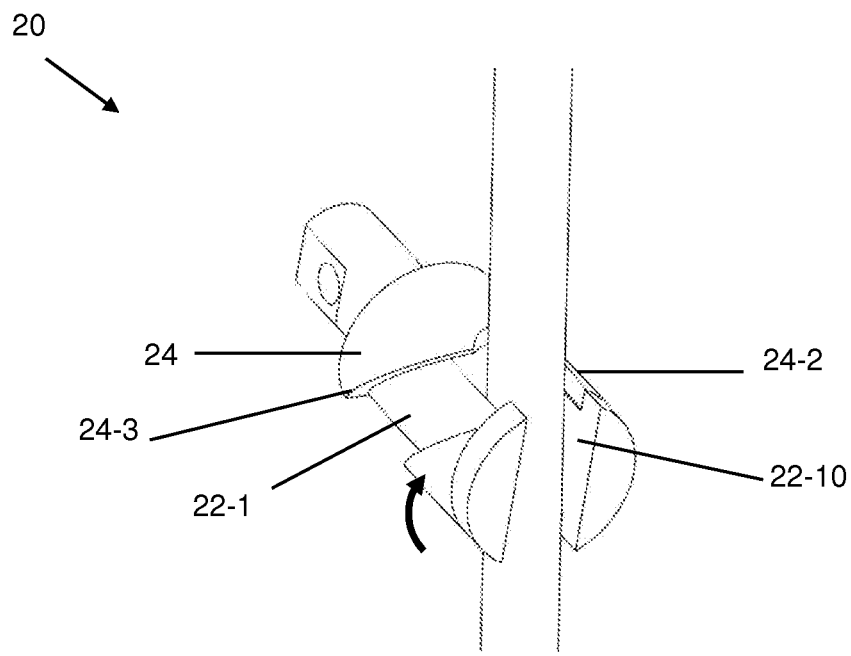
FIGS. 6A-6D are perspective views illustrating a method for loading a rope into the reduction mechanism depicted in FIGS. 4A-4B in accordance with an embodiment of the present invention.
Figure 6B:
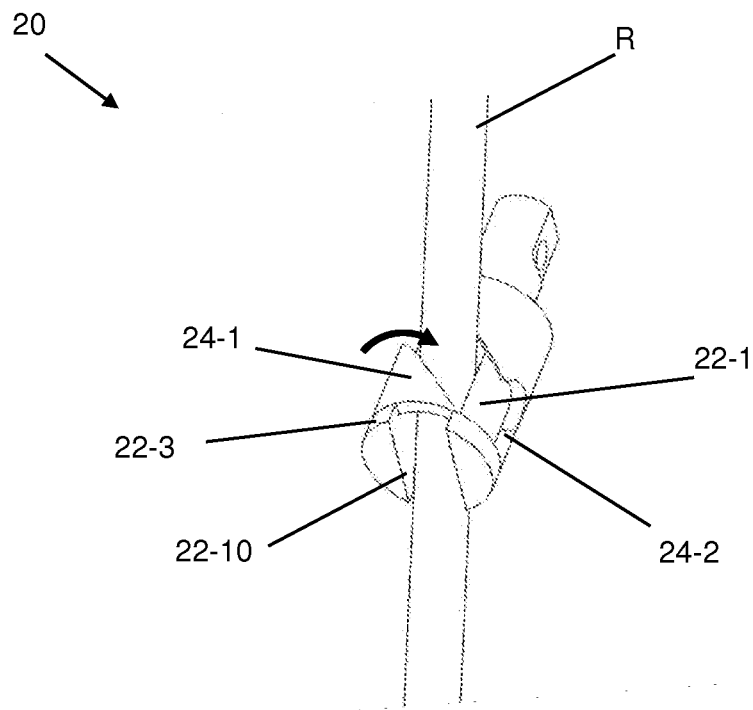
Figure 6C:
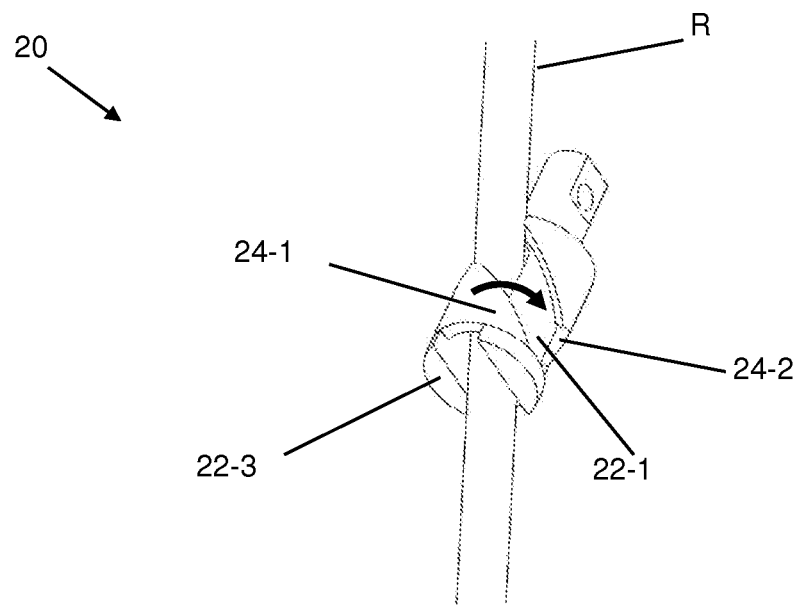
Figure 6D:
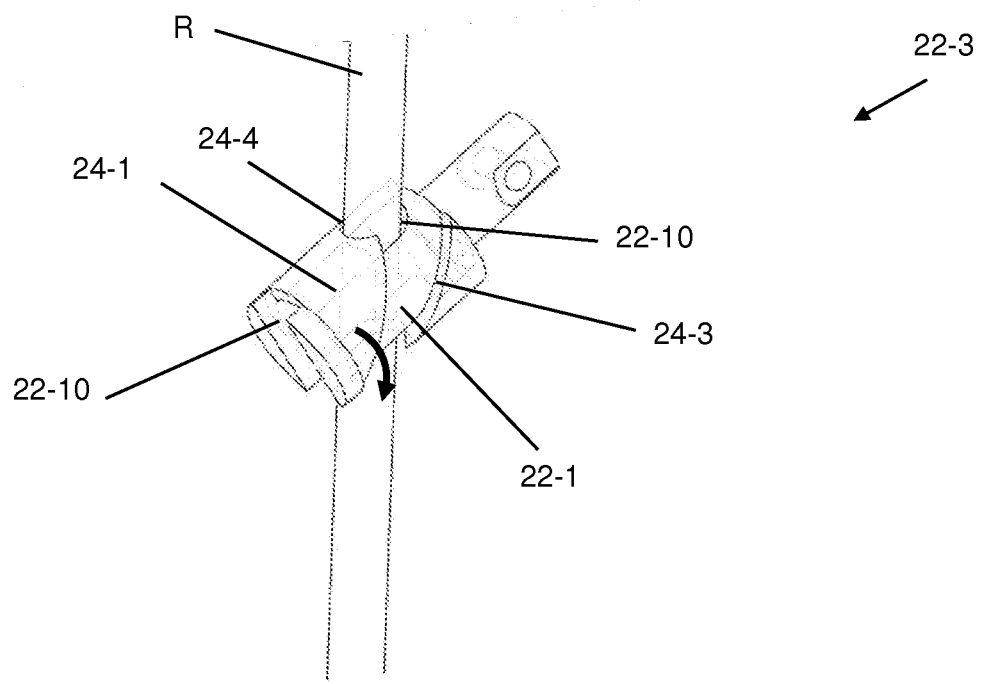

Referring to FIGS. 6A-6D, perspective views illustrating a method for loading the rope R into the reduction mechanism 20 depicted in FIGS. 4A-4B is disclosed. In FIG. 6A, the ingress opening 24-2 of the cammed bushing is aligned with the oblong slot 22-10 of the yoke member 22. A portion of the rope R is inserted into slot 22-10 and the opening 24-2. In FIG. 6B, the user rotates the bushing in the direction indicated by the arrow such that the cammed surface 24-1 substantially closes the slotted opening 22-10. In FIG. 6C, the user continues the process as the cammed surface 24-1 slides over the cylindrical yoke body 22-1. This rotational action of the cammed bushing forces the rope to move upwardly into the slot 22-10. In FIG. 6D, the rope loading process is essentially completed. At this point, the rope R has moved along the entire edge of the cammed surface 24-1 and has been locked into the egress pocket 24-4. In this locked position, the rope R extends through the ingress pocket 24-2, the slot 22-10 and the egress pocket 24-2. When the reduction mechanism is disposed at an oblique angle relative to the rope R, the rope is engaged by the edges of the bushing body at both pockets (24-2, 24-4). As the reduction mechanism is rotated, the rope R tends to bend in an S-curve to thus increase the friction applied at the pockets (24-2, 24-4). When the reduction mechanism is positioned substantially normal to the longitudinal axis of the rope R, the pockets (24-2, 24-4) are substantially aligned to minimize the applied friction.

Referring to FIG. 7, a detail perspective view of the climbing mechanism in accordance with an embodiment of the present invention is disclosed. In this view, the user can freely advance the mechanism up the rope by pushing up on the bottom handle 16-3. When the user takes this action, the clamping elements 14 and the reduction mechanism 20 angle slightly down toward the "unlocked" position. At the same time, the reduction mechanism 20 is disposed substantially normal to the longitudinal axis of the rope R and is therefore disengaged allowing near frictionless movement up the rope. When the user applies her weight to the device, by sitting back in her harness, the clamping elements and the reduction mechanism angle up to the clamped position. This action by the user misaligns the apertures of the clamp segments 14-1 and the reduction mechanism, clamping the rope and substantially prevent any downward movement along the rope R.

Figure 8:
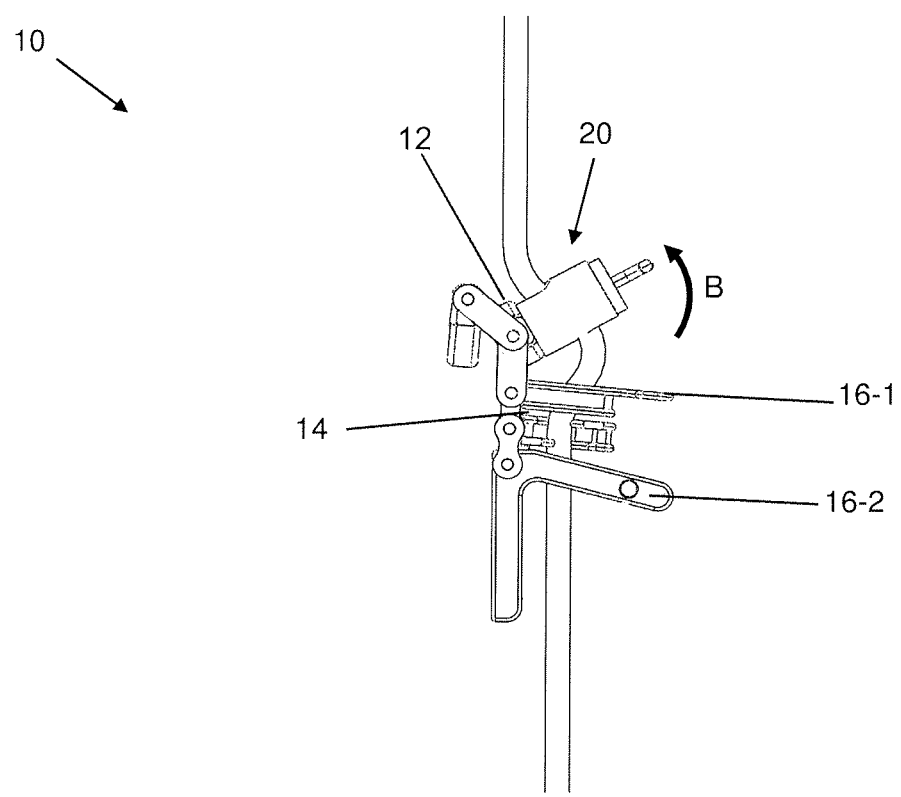
FIG. 8 is a detail perspective view of the safety device depicted in FIG. 7 during a descent procedure.

Referring to FIG. 8, a detail perspective view of the safety device 10 during a descent procedure is disclosed. Here, the user squeezes the top release tab 16-1 and the bottom release tab 16-2 together, the bottom handle 16-3 and release tab 16-2 are held in their proper angular orientation by the user's weight, which is applied to the bottom of the handle 16-3 (i.e., the user's point of connection). By squeezing of the release tabs together, only the top release tab is depressed downwardly. This action releases the grip of the clamping elements 14-1 on the rope, and allows the rope to slide freely through the clamp 14. However, before the rope is able to slide, the reduction mechanism rotates to its fully engaged position. Accordingly, with the reduction mechanism fully engaged and adding friction to the system, the user descends down the rope in a smooth and controlled manner. Thus, the safety device of the present invention substantially eliminates the drawbacks associated with conventional single rope devices. In other words, the sudden drops and jerking motions characteristic of the conventional devices are substantially eliminated or dampened. Moreover, the present invention allows the user to descend with a wide range of speed; and therefore, this feature provides the user with a feeling of greater control.

Briefly stated, the clamp segments 14-1 allow the rope to pass freely there through, but the reduction mechanism 20 applies enough frictional force to substantially reduce the descending speed. The reader will note that the reduction mechanism 20 provides three degrees of freedom in controlling the movement of the rope R. The collar 12 allows the reduction mechanism 20 to move in an angular direction θ with respect to the rope (y-axis). As explained above, the cammed bushing 24 is provided with some clearance space between the collar 12 and the shoulder 22-3 such that it can move along the longitudinal axis of the reduction mechanism (x-axis) (between the shoulder 22-3 and the collar 12). In addition, the cammed bushing 24 is configured to rotate about the longitudinal axis of the reduction mechanism (x-axis). Clearly, the major control action taken by the user is squeeze the release mechanism to thereby cause the reduction mechanism 20 to rotate upwardly (i.e., about 60 degrees), but the other two degrees of freedom allow the bushing 24 to move incrementally and adaptively to provide a fine tuning of sorts that gives the user a greater degree of control over the descending process. As a result, the user descends in a smooth and controlled manner without any sudden and disconcerting drops or jerking motions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A safety device for use in a single rope technique arrangement, the device comprising:
   a clamping mechanism including a plurality of clamping segments interconnected by a flexible spine arrangement, the flexible spine arrangement comprising a plurality of interconnected linking elements, each of the plurality of clamping segments respectively including a first end, a second end and a rope channel having a first aperture and a second aperture sized to substantially accommodate a diameter of a single rope, the first aperture being substantially offset longitudinally and laterally from the second aperture, each said first end directly connected to the flexible spine arrangement;

a release mechanism coupled to the clamping mechanism, the release mechanism including an actuation handle coupled to the flexible spine arrangement and configured to move the plurality of segments between a clamping position and a released position, the actuation handle configured to apply a first force to the flexible spine arrangement that substantially misaligns the rope channels of adjacent clamping segments of the plurality of clamping segments in the clamping position and configured to apply a second force that substantially aligns the rope channels of adjacent clamping segments of the plurality of clamping segments in the released position, the clamping position configured to apply more friction to said rope than the release position during use; and a reduction mechanism coupled to the flexible spine arrangement, the reduction mechanism including a body portion having a rope slot configured to accommodate the single rope, the reduction mechanism further including a housing portion disposed pivotally about the body portion, the housing portion including a cammed groove configured to accommodate the single rope, the cammed groove being configured to move rotationally and linearly with respect to the rope slot, the reduction mechanism configured to frictionally engage the single rope in the released position in order to slow descent of the device with respect to the single rope during use.

2. The device of claim 1, wherein the reduction mechanism includes three degrees of freedom.

3. The device of claim 1, wherein at least some of the plurality of interconnected linking elements are disposed between adjacent clamping segments of the plurality of clamping segments.

4. The device of claim 2, wherein each linking element includes a first linking portion disposed on a first side of adjacent clamping segments of the plurality of clamping segments and a second linking portion disposed on an opposing side of the adjacent clamping segments of the plurality of clamping segments.

5. The device of claim 4, wherein each linking element includes a connective arrangement configured to interconnect the first linking portion, adjacent clamping segments of the plurality of clamping segments and the second linking portion.

6. The device of claim 1, wherein a clamping segment of the plurality of clamping segments is substantially rectangular in shape.

7. The device of claim 6, wherein the first aperture is formed in one interior surface of the clamping segment, the second aperture being formed in an opposing interior surface of the clamping segment.

8. The device of claim 1, wherein each clamping segment of the plurality of clamping segments is rotatably fixed at the flexible spine arrangement in a cantilevered arrangement.

9. The device of claim 6, wherein each clamping segment of the plurality of clamping segments is rotatably fixed at the flexible spine arrangement such that the plurality of clamping segments are substantially disposed in parallel.

10. The device of claim 1, wherein a clamping segment of the plurality of clamping segments includes a lateral opening formed in a side surface thereof, the lateral opening interconnecting the first aperture and the second aperture to form the rope channel.

11. The device of claim 10, wherein a centerline of the rope channel forms an oblique angle relative to a longitudinal axis of the clamping segment.

12. The device of claim 1, wherein the body portion is substantially cylindrical and includes a shoulder portion at a first end thereof, the shoulder portion being configured to retain the housing portion at the first end thereof.

13. The device of claim 12, wherein the body portion includes a connective element disposed at a second end thereof, the connective element being configured to couple the reduction mechanism to the flexible spine arrangement.

14. The device of claim 13, wherein the housing portion is retained between the shoulder portion and the connective element.

15. The device of claim 12, wherein the housing portion is substantially a cylindrical housing, the cylindrical housing being rotatably disposed over the body portion in a coaxial arrangement.

16. The device of claim 15, wherein the cammed groove includes a first opening formed at a first end of the cylindrical housing at a first angular position and a second opening formed at a second end of the cylindrical housing at a second angular position substantially offset from the first angular position.

17. The device of claim 16, wherein the first opening is aligned with the rope slot when a portion of the single rope is loaded into the device.

18. The device of claim 17, wherein the cylindrical housing is configured to be rotated with respect to the body portion to move the portion of the single rope along the cammed groove until it is disposed in the second opening.

19. The device of claim 1, wherein the body portion is rotatably movable with respect to the clamping mechanism when the device moves between the clamping position and the released position.

20. The device of claim 1, wherein the housing portion is longitudinally or rotationally movable with respect to the body portion when the device moves between the clamping position and the released position.

21. The device of claim 1, wherein the housing portion is configured to be rotated to align the cammed groove and the rope slot to load a section of the single rope into the reduction mechanism.

* * * * *